United States Patent Office 3,519,716
Patented July 7, 1970

3,519,716
TREATMENT OF HYPERURICEMIA IN MAMMALS, USING MERCAPTO-SUBSTITUTED PYRAZOLO(3,4-d)-PYRIMIDINES
George H. Hitchings, Yonkers, and Elvira A. Falco, New Rochelle, N.Y., assignors to Burroughs Wellcome & Co. (U.S.A.) Inc., Tuckahoe, N.Y., a corporation of New York
No Drawing. Continuation-in-part of application Ser. No. 524,830, Feb. 3, 1966. This application Apr. 12, 1968, Ser. No. 721,090
Claims priority, application Great Britain, May 23, 1962, 19,863/62; Aug. 23, 1962, 32,519/62
Int. Cl. A61k 27/00
U.S. Cl. 424—251                                        6 Claims

ABSTRACT OF THE DISCLOSURE

The method of treatment and prophylaxis for hyperuricemia, which comprises administering to a mammal an antihyperuricemia therapeutically effective amount of a mercapto-substituted pyrazolo(3,4-d)pyrimidine. The present invention relates to a method of treatment and hyperuricemia in mammals as, for example, Dalmatian dogs.

---

This application is a continuation-in-part of our applications Ser. No. 574,576 filed Mar. 29, 1956, now abandoned; Ser. No. 22,394 filed Apr. 15, 1960, now abandoned; Ser. No. 221,357, filed Sept. 4, 1962, now abandoned; and Ser. No. 524,830 filed Feb. 3, 1966, now abandoned.

It has been found that certain new mercapto-substituted pyrazolo(3,4-d)pyrimidines are capable of preventing the formation of uric acid, thus providing a method for treating hyperuricemia in mammals. The compounds used in the present invention comprise pyrazolo(3,4-d) pyrimidines of the general formula:

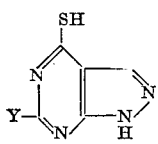

wherein Y is selected from the class consisting of mercapto and hydroxyl.

Hyperuricemias, both primary and secondary, are associated with gout and uric acid lithiasis of the kidney and related complications. An excess production of uric acid may be a metabolic defect. Hyperuricemia may also be iatrogenic in origin, secondary to the use of thiazide diuretics or drugs such as 2-ethylamino-1,3,4-thiadiazole.

It is apparent, therefore, that a reduction in the metabolic production of uric acid will provide a method of treating hyperuricemia.

Many patients afflicted with gout (which is a form of hyperuricemia) form and secrete abnormally large amounts of uric acid and develop crystals in the joints. Such patients often develop kidney stones composed of uric acid which cause pain and renal damage. Similarly, patients with secondary hyperuricemias attendant upon various types of neoplastic disease, deposit large amounts of uric acid in the kidneys, resuling in kidney blockage. The use of the compounds of Formula I as disclosed herein, can prevent the formation of such excessive amounts of uric acid.

For use in the treatment of hyperuricemia, gout being one form thereof, the compounds used herein may be conveniently presented as a combined pharmaceutical formulation, the uricosuric drugs now utilized in treating patients having excess uric acid.

The compounds used herein may advantageously be presented in discrete units such as tablets, capsules, cachets, ampoules or supporitories. The active ingredients may also be presented in a powder or granules, as a solution or suspension in an aqueous, non-aqueous or emulsified liquid. For parenteral use, the formulations must be sterile and are presented in sealed containers. The formulations of this invention may be made by any of the methods of pharmacy and may include one or more of the following accessory ingredients: diluents, solutes, buffers, flavoring, binding, dispersing, surface-active, thickening, lubricating and coating materials, preservatives, antioxidants, bacteriostats, suppository and ointment bases and any other acceptable excipients. A preferred form is a compressed tablet containing 100 mg. of the active ingredient with about 350 mg. of lactose and suitable granulating and lubricating materials.

A daily dosage of the compounds used in this invention is ordinarily in the range of 100 mg. to 800 mg. per dosage. In some instances, a loading dose about twice the daily dose is desirable.

The present invention, therefore, comprises the treatment and prophylaxis for hyperuricemia in mammals by the administration of a compound of Formula I to the mammal. The dosage administered is preferably 1 to 40 mg./kg. of body weight per day.

The invention will now be described with reference to the following examples, in which all temperatures are given in degrees centigrade.

EXAMPLE 1

Pyrazolo-3,4-dicarboxamide

To 7.5 g. of pyrazolo-3,4-dicarboxylic acid, there was added 150 ml. of thionyl chloride. This mixture was heated under reflux conditions for ten hours. The thionyl chloride was removed in vacuo and the powdery residue was added, in portions, to a cold stirred solutions of tert-butanol which had been saturated with ammonia at 0°. After the compound had all been added (1 hour), the mixture was allowed to stand for an additional five hours. The precipitate was then removed and boiled with 100 ml. of concentrated ammonium hydroxide solution (1 hour). This solution was allowed to evaporate to dryness on the steam bath and the residue crystallized from boiling water. The compound thus obtained formed colorless plates melting with decomposition at 327°.

EXAMPLE 2

4,6-dihydroxy 1-pyrazolo(3,4-d)pyrimidine

To a cold solution of 16.6 ml. of 0.4 M sodium hypochlorite solution, was added (all at once) 500 mg. of pyrazone - 3,4 - dicarboxamide. The reaction mixture turned pink, then faintly yellow. After standing at 0° for one hour, the reaction mixture was acidified to pH 3 with 2 N hydrochloric acid and the flocculent precipitate was removed. The compound was recrystallized from boiling water to give colorless needles, in rosettes. The compound does not melt at 320°.

EXAMPLE 3

Preparation of 4-mercapto-6-hydroxy-1-pyrazolo (3.4-d)pyrimidine

To 4 g. of the 4,6-dihydroxy compound described in Example 2, there was added 12 g. of phosphorus pentasulfide and 60 ml. of dry pyridine. This mixture was heated for three hours at reflux temperature. The pyridine was removed in vacuo and the residue taken up in cold dilute sodium hydroxide solution. On acidification, there was obtained 3.5 g. of a pale yellow compound. This compound, after crystallization from boiling water, formed yellow plates which do not melt at 360°. This compound had the following u.v. absorption spectrum: at pH 1, the maxima are at 257 and 324 m$\mu$, while at pH 11, the peaks are at 258 and 330 m$\mu$.

EXAMPLE 4

Preparation of the 4,6-dimercapto-1-pyrazolo(3,4-d) pyrimidine

To the monomercapto compound described in Example 3 (1 g.) was added 3 g. of phosphorus pentasulfide and 60 ml. of pyridine. This mixture was heated for sixteen hours and worked up as described in Example 3. The compound was crystallized from boiling water to give a yellow powder which did not decompose at 320°.

The other compounds used herein may be made by the above procedures and would be apparent to one skilled in the art.

What is claimed is:

1. The method of treatment and prophylaxis for hyperuricemia in mammals, which comprises administering to said mammal an antihyperuricemia therapeutically effective amount of a compound of the Formula I

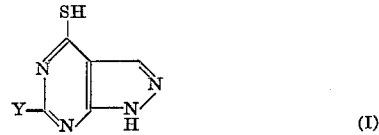

wherein Y is selected from the class consisting of mercapto and hydroxyl.

2. The method of claim 1, wherein the compound of Formula I is administered at a dosage of 1 to 40 mg./kg. of the body weight of the mammal treated.
3. The method of claim 1, wherein Y is mercapto.
4. The method of claim 2, wherein Y is mercapto.
5. The method of claim 1, wherein Y is hydroxyl.
6. The method of claim 2, wherein Y is hydroxyl.

References Cited

Packaging Brochure for Zyloprim, pp. 1–4, July 1966.

ALBERT T. MEYERS, Primary Examiner

J. D. GOLDBERG, Assistant Examiner

U.S. Cl. X.R.

260—256.4